US011158108B2

(12) United States Patent
Bleyer et al.

(10) Patent No.: US 11,158,108 B2
(45) Date of Patent: Oct. 26, 2021

(54) SYSTEMS AND METHODS FOR PROVIDING A MIXED-REALITY PASS-THROUGH EXPERIENCE

(71) Applicant: Microsoft Technology Licensing, LLC, Redmond, WA (US)

(72) Inventors: Michael Bleyer, Seattle, WA (US); Christopher Douglas Edmonds, Carnation, WA (US); Donald John Patrick O'Neil, Seattle, WA (US); Raymond Kirk Price, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/703,237

(22) Filed: Dec. 4, 2019

(65) Prior Publication Data

US 2021/0174570 A1 Jun. 10, 2021

(51) Int. Cl.
*G06T 15/04* (2011.01)
*G06T 19/00* (2011.01)
(Continued)

(52) U.S. Cl.
CPC ............ *G06T 15/04* (2013.01); *G02B 27/017* (2013.01); *G06F 3/012* (2013.01); *G06T 19/006* (2013.01);
(Continued)

(58) Field of Classification Search
CPC ... G06T 15/04; G06T 19/006; G06T 19/0138; G02B 27/017; G02B 2027/014; G02B 2027/0138; G06F 3/012; G06F 3/011
See application file for complete search history.

(56) References Cited

U.S. PATENT DOCUMENTS 6,611,268 B1 * 8/2003 Szeliski ................. G06T 7/194
345/473
2011/0211045 A1 9/2011 Bollano et al.
(Continued)

FOREIGN PATENT DOCUMENTS

WO WO-2015192117 A1 * 12/2015 ............ G06F 3/012

OTHER PUBLICATIONS

Dresser, et al., "Accelerating Augmented Reality Video Processing with FPGAs", In Publication of Worcester Polytechnic Institute, Apr. 27, 2016, 69 Pages.
(Continued)

*Primary Examiner* — Michael Le
(74) *Attorney, Agent, or Firm* — Workman Nydegger

(57) ABSTRACT

Systems and methods for providing a mixed-reality pass-through experience include implement acts of obtaining a texture map of a real-world environment, obtaining a depth map of the real-world environment, obtaining an updated texture map of the real-world environment subsequent to the obtaining of the depth map and the texture map, and rendering a virtual representation of the real-world environment utilizing both the depth map and the updated texture map that was obtained subsequent to the depth map. The texture map and the depth map may be based on a same image pair obtained from a pair of stereo cameras, the depth map being obtained by performing stereo matching on the same image pair. Additionally, the acts may further include detecting a predicted pose of a user and reprojecting a portion of the depth map to conform to a user perspective associated with the predicted pose.

20 Claims, 8 Drawing Sheets

(51) Int. Cl.
*G02B 27/01* (2006.01)
*G06F 3/01* (2006.01)

(52) U.S. Cl.
CPC ............... *G02B 2027/014* (2013.01); *G02B 2027/0138* (2013.01)

(56) References Cited

U.S. PATENT DOCUMENTS

| | | | |
|---|---|---|---|
| 2012/0182403 A1* | 7/2012 | Lange | H04N 13/388 348/51 |
| 2014/0145914 A1 | 5/2014 | Latta et al. | |
| 2015/0281598 A1* | 10/2015 | Southerland | H04N 21/4348 348/164 |
| 2015/0381972 A1* | 12/2015 | Kowdle | G06T 7/521 348/51 |
| 2016/0088287 A1* | 3/2016 | Sadi | H04N 13/261 348/43 |
| 2017/0213388 A1* | 7/2017 | Margolis | G06F 3/013 |
| 2018/0061034 A1* | 3/2018 | Zhao | G01B 11/2513 |
| 2019/0096023 A1 | 3/2019 | Diefenbaugh et al. | |
| 2019/0258058 A1 | 8/2019 | Fortin-deschênes et al. | |
| 2019/0279379 A1 | 9/2019 | Srinivasan et al. | |
| 2020/0288111 A1* | 9/2020 | Sheng | H04N 13/167 |

OTHER PUBLICATIONS

Lincoln, Peter C., "Low Latency Displays for Augmented Reality", In dissertation of the University of North Carolina, Jan. 2017, 101 Pages.

Munir, et al., "Real-Time Fine Grained Occupancy Estimation using Depth Sensors on ARM Embedded Platforms", In IEEE Real-Time and Embedded Technology and Applications Symposium, Apr. 18, 2017, 12 Pages.

Olano, et al., "Combatting Rendering Latency", In Proceedings of the symposium on Interactive 3D graphics, Apr. 15, 1995, 7 Pages.

Scharstein, Daniel, "Stereo Vision for View Synthesis", In Proceedings of CVPR IEEE Computer Society Conference on Computer Vision and Pattern Recognition, Jun. 18, 1996, pp. 852-858.

"International Search Report and Written Opinion Issued in PCT Application No. PCT/US20/059904", dated Mar. 5, 2021, 12 Pages.

\* cited by examiner

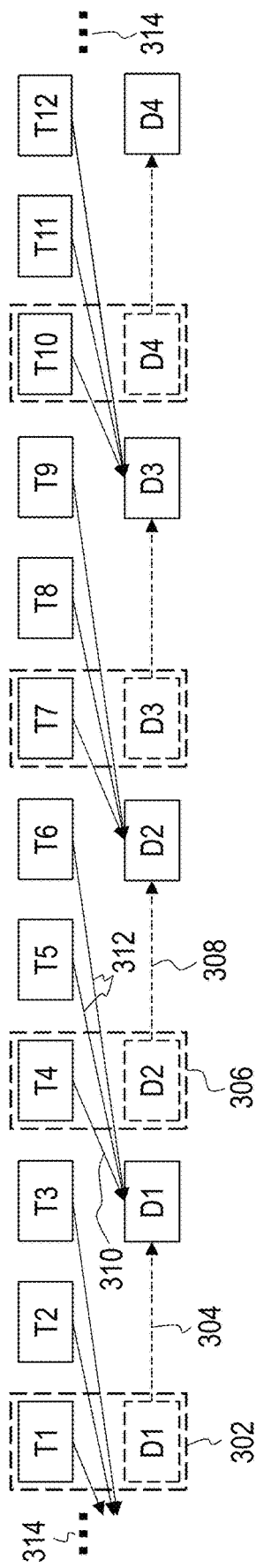
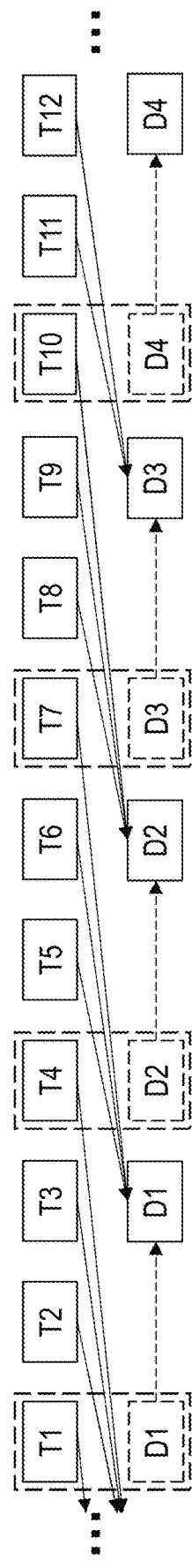
Figure 3A
Figure 3B

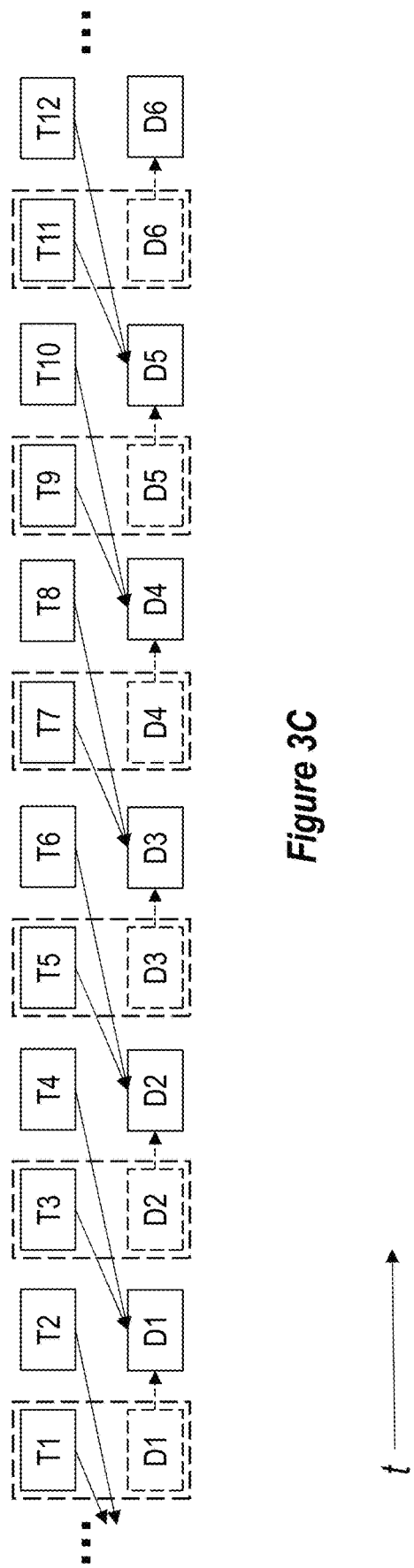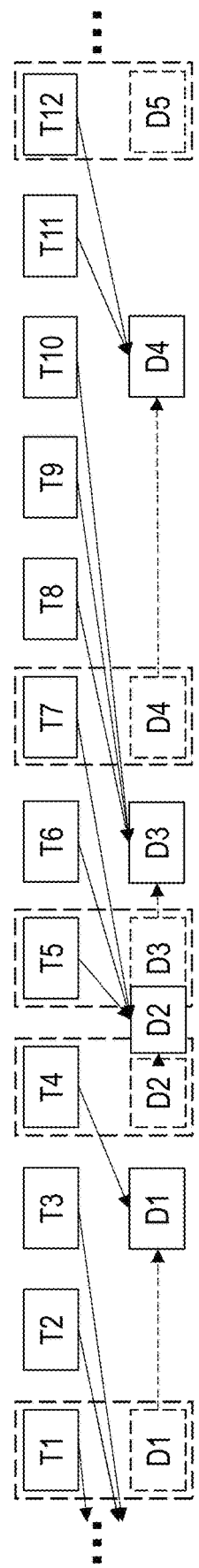
*Figure 3C*
*Figure 3D*

SYSTEMS AND METHODS FOR PROVIDING A MIXED-REALITY PASS-THROUGH EXPERIENCE

BACKGROUND

Mixed-reality systems, including virtual-reality and augmented-reality systems, have received significant attention because of their ability to create truly unique experiences for their users. For reference, conventional virtual-reality (VR) systems create a completely immersive experience by restricting their users' views to only a virtual environment. This is often achieved through the use of a head-mounted device (HMD) that completely blocks any view of the real world. As a result, a user is entirely immersed within the virtual environment. In contrast, conventional augmented-reality (AR) systems create an augmented-reality experience by visually presenting virtual objects that are placed in or that interact with the real world.

As used herein, VR and AR systems are described and referenced interchangeably. Unless stated otherwise, the descriptions herein apply equally to all types of mixed-reality systems, which (as detailed above) includes AR systems, VR reality systems, and/or any other similar system capable of displaying virtual objects.

Mixed-reality systems may use one or more on-body devices (e.g., the HMD, a handheld device, etc.). The HMD provides a display that enables a user to view overlapping and/or integrated visual information in whatever environment the user is in, be it a VR environment or an AR environment.

Continued advances in hardware capabilities and rendering technologies have greatly improved how mixed-reality systems render virtual objects. However, the process of immersing a user into a mixed-reality environment creates many challenges, difficulties, and costs, particularly with regard to presenting virtual content such that the user perceives the virtual content in a manner that emulates the way the user perceives real-world objects.

For instance, users may become disoriented when transitioning between an immersive mixed-reality environment and a real-world environment. One approach for addressing user disorientation when transitioning between real and virtual environments is to provide pass-through functionality on mixed-reality HMDs to help users acclimate into a mixed-reality environment gradually. Some HMD pass-through systems are driven by camera images. For example, an HMD may include a camera that captures images of the user's real-world environment, and the HMD may present the captured images to the user on a display of the HMD. Other HMD pass-through systems are optics driven. For example, an HMD may include optical diverter systems, with one end of the optical system facing the real-world environment and another end of the optical system facing the user's eye, for presenting the real-world environment to the user through the optical diverter system.

Conventional HMD pass-through systems suffer from a number of disadvantages. For instance, depth details of the user's real-environment may be lost when the HMD presents the 2-dimensional camera image representation of the real-world environment to the user. Additionally, the perspective of the camera modules in an AR system are sometimes not telecentric with the user's eyes. In some cases, it is beneficial to reproject the camera images to the user's perspective. Such a reprojection may be based on the understanding and calculation of the 3D geometry of the scene that is being viewed to enable the per-pixel reprojection of the camera images. The scene depth calculation and accompanying reprojection can be computationally intensive and can introduce substantial latency into the system. For example, the computational burden of depth calculation increases as the size of the image and/or the number of depth disparity values to be calculated increases. Accordingly, calculating a full-resolution depth map for each captured image, in real time, is computationally expensive, and it is desirable to improve these computations.

Additionally, in optics-driven systems, the world-facing ends of the optical diverter systems are displaced from the positions of the user's eyes. Accordingly, in either camera-driven systems or optics-driven systems, parallax error may exist, ironically causing the imagery from the cameras to be misaligned with the user's view of the real world. Thus, conventional HMD pass-through systems may inhibit users from interacting with their environments in a safe manner and with confidence in the representations of the real-world provided by the HMD if images are not corrected for such parallax and particularly if the correction is delayed in any part due to processing requirements. Accordingly, there exists a substantial need to improve systems and methods for providing a mixed-reality pass-through experience.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include systems and methods for providing a mixed-reality pass-through experience and by, in some instances, by processing images with improved processing efficiencies over known systems.

In some instances, a system includes one or more processors and one or more computer-readable media having stored computer-executable instructions that are operable, when executed by the one or more processors, to cause the system to perform certain acts. In some embodiments, the acts include obtaining a texture map of a real-world environment, obtaining a depth map of the real-world environment, obtaining an updated texture map of the real-world environment subsequent to the obtaining of the depth map and the texture map, and rendering a virtual representation of the real-world environment, utilizing both the depth map and the updated texture map that was obtained subsequent to the depth map.

In some embodiments, the texture map and the depth map are based on an image pair obtained from a pair of stereo cameras, the depth map being obtained by performing stereo matching on the same image pair. Additionally, in some embodiments, the acts may further include detecting a predicted pose of a user and reprojecting a portion of the depth map to conform to a user perspective associated with the predicted pose, such as, for example, through late stage reprojection (LSR).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIGS. 3A-3D illustrate conceptual representations of mixed-reality systems combining texture data and depth data to generate a reprojected view of the real-world environment to the display system;

DETAILED DESCRIPTION

Figure 1:
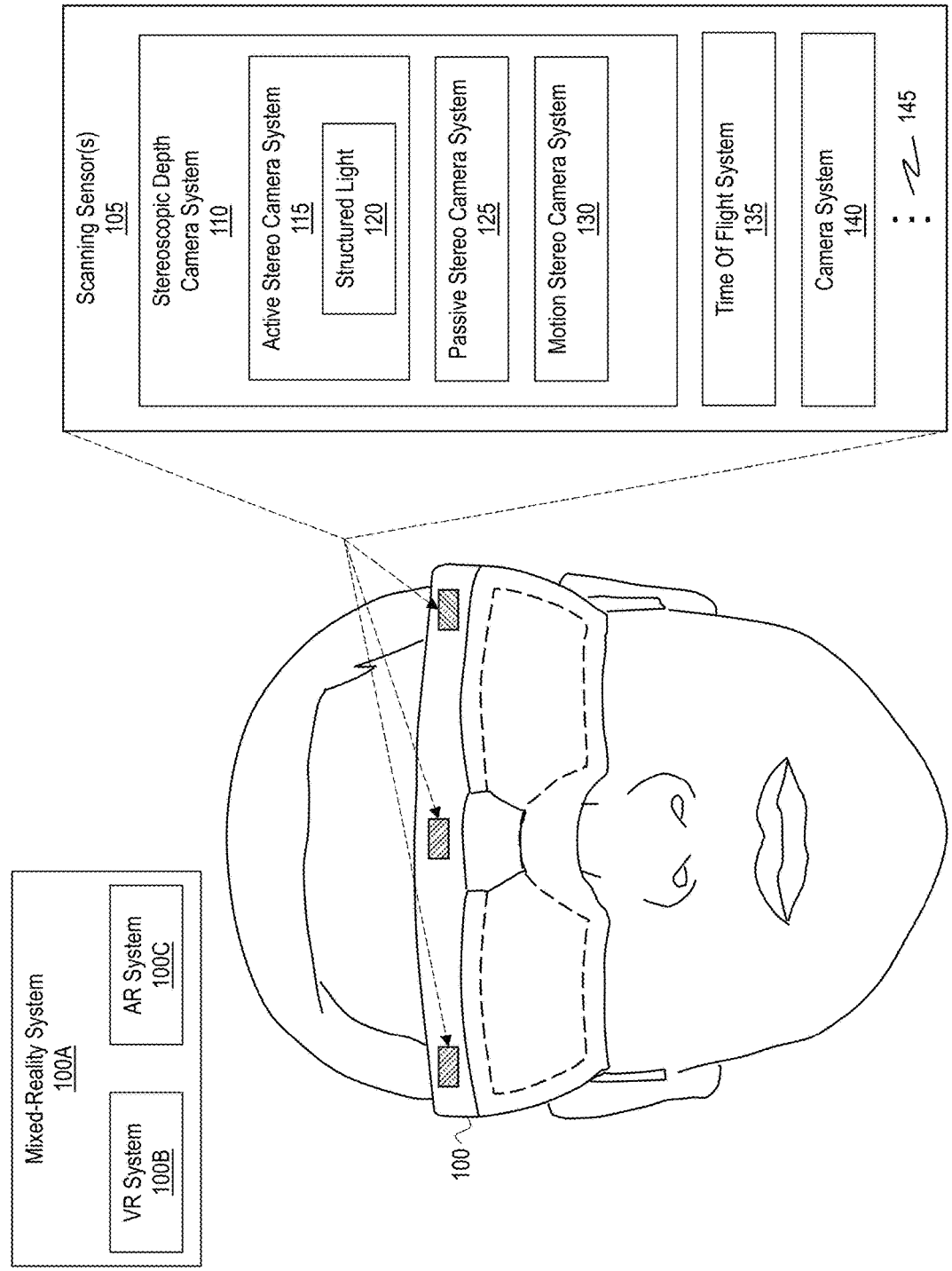
FIG. 1 illustrates an example of components of a mixed-reality system (e.g., a mixed-reality HMD) that include sensors for detecting depth and/or texture within a real-world environment.

Disclosed embodiments are directed to systems and methods for providing a mixed-reality pass-through experience based on virtual representations of real-world objects.

In some instances, a system includes one or more processors and one or more computer-readable media having stored computer-executable instructions that are operable, when executed by the one or more processors, to cause the system to perform certain acts. In some embodiments, the acts include capturing stereo pair camera information from the real-world environment, obtaining a texture map of a real-world environment, obtaining a depth map of the real-world environment, obtaining an updated texture map of the real-world environment subsequent to the obtaining of the depth map and the texture map, and rendering a virtual representation of the real-world environment utilizing both the depth map and the updated texture map that was obtained subsequent to the depth map.

In some embodiments, the texture map and the depth map are based on a same image pair obtained from a pair of stereo cameras, the depth map being obtained by performing stereo matching on the same image pair. Additionally, in some embodiments, the acts may further include detecting a predicted pose of a user and reprojecting a portion of the depth map to conform to a user perspective associated with the predicted pose.

Those skilled in the art will recognize that at least some of the disclosed may address various shortcomings of conventional mixed-reality pass-through systems. For example, the mixed-reality systems of the present disclosure may provide a mixed-reality pass-through experience that reduces parallax error to allow users to navigate their real-world environment in a safe and confident manner.

Additionally, in some instances, the presently disclosed mixed-reality systems may provide a pass-through experience that captures depth details of real-world objects, allowing users to accurately perceive the real-world positionings of surrounding physical objects. Furthermore, at least some disclosed mixed-reality systems may provide a low-latency, depth-accurate pass-through experience, despite the computational expense associated with depth calculation/mapping.

It will be particularly noted that, in some instances, the disclosed processes can be used to improve efficiencies over existing systems for processing and generating a virtual representation of a real-world environment. For instance, the disclosed systems may selectively refrain from obtaining a depth map for every texture map that the system obtains, which may prevent the framerate of a mixed-reality pass-through experience from being throttled or otherwise limited by the time it takes to perform depth processing over existing systems. One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

Having just described some of the various high-level features and benefits of the disclosed embodiments, attention will now be directed to FIGS. 1 through 6. These Figures illustrate various conceptual representations, architectures, methods, and supporting illustrations related to providing an improved mixed-reality pass-through experience. The disclosure will then turn to FIG. 7, which presents an example computer system that may be used to facilitate the disclosed principles.

Attention will now be directed to FIG. 1, which illustrates an example of a head-mounted device (HMD) 100. HMD 100 can be implemented as any type of mixed-reality system 100A, including a VR system 100B or an AR system 100C. It should be noted that while a substantial portion of this disclosure is focused on the use of an HMD to generate depth and/or texture information associated with a real-world environment, the embodiments are not limited to being practiced using only an HMD. That is, any type of scanning system can be used, even systems entirely removed or separate from an HMD. As such, the disclosed principles should be interpreted broadly to encompass any type of scanning scenario or device. Some embodiments may even refrain from actively using a scanning device themselves and may simply use the data generated by the scanning device. For instance, some embodiments may be practiced in a cloud computing environment and/or distributed system in which different components are disparately located from each other.

HMD 100 is shown as including scanning sensor(s) 105, and HMD 100 can use the scanning sensor(s) 105 to scan and map any kind of environment. Scanning sensor(s) 105 may comprise any number or any type of scanning devices, without limit. The scanning sensor(s) 105 may detect depth information and/or texture information based on sensor data acquired by the scanning sensor(s) 105 (e.g., depth map(s) and/or texture map(s)).

As used herein, a "depth map" includes depth data detailing the distance from the sensor to any objects captured by the sensor (e.g., a z-axis range or measurement) and/or the positional arrangement, location, geometries, contours, and depths of objects in the environment. By way of example, a depth map may include, but is not limited to, any type of surface reconstruction (SR) mesh (e.g., a mesh that includes polygons or 3D triangles whose shape and orientation digitally represents and describes the shapes, geometries, and contours of an environment), a 3D point cloud (e.g., a compilation of dots or points that are used to digitally represent the environment), or any other 3D digital representation or geometric reconstruction of the environment. As used herein, a "texture map" includes a 2D image that is used to produce texture data detailing the visual characteristics/texturing of any objects captured by the sensor. As will be described in more detail hereinafter, the HMD 100 may utilize a combination of the depth maps and the texture maps to generate a virtual representation of an environment.

The scanning sensor(s) 105 of the HMD 100 may utilize various sensing apparatuses and/or combinations thereof to obtain depth information and/or texture information to generate a depth map and/or texture map of a real-world environment. In some implementations, the scanning sensor(s) 105 are implemented as a stereoscopic depth camera system 110. A stereoscopic depth camera system 110 may be configured as an active stereo camera system 115, which projects light (e.g., visible light and/or infrared light) into the environment to better determine depth. In some instances, the projected/illuminated light is structured light 120 (e.g., light that is projected using a known pattern so as to provide artificial texture to the environment). In some embodiments, the stereoscopic depth camera system 110 is configured as a passive stereo camera system 125 or perhaps even as a motion stereo camera system 130.

A stereoscopic depth camera system 110 may capture at least two images of an environment from different perspectives for comparing the images to obtain depth information. Additionally, because the stereoscopic depth camera system 110 captures images of the environment, the HMD may utilize the same images used to obtain depth information to also obtain texture information associated with the environment.

In some embodiments, the scanning sensor(s) 105, additionally or alternatively, include a time of flight (TOF) system 135 for generating depth information of an environment. TOF systems are generally known in the art and will not be described in detail herein. Furthermore, the scanning sensor(s) 105 may utilize a camera system 140 for generating texture information associated with the environment. The camera system 140 may be distinct from the cameras of the stereoscopic depth camera system 110 (if present).

It will be appreciated that the scanning sensor(s) 105 may include various types of cameras as part of a camera system 140 and/or stereoscopic depth camera system 110. For instance, the camera(s) may be configured as rolling shutter cameras and/or global shutter cameras and may include such as RGB cameras, visible light cameras, visible plus infrared sensitive cameras, monochrome cameras, and/or infrared cameras (e.g., near-infrared, short wavelength infrared, and/or long wavelength infrared), and/or cameras configured for capturing any range of wavelengths (e.g., any range within 300 nm-18 μm) with any range of photosensitivity or pixel size (e.g., pixels from 1 μm-18 μm). Additionally, those skilled in the art will recognize that any camera of the HMD may perform multiple functions that are distinct from those explicitly focused on herein (e.g., head tracking).

The ellipsis 145 is provided to illustrate how the scanning sensor(s) 105 may include any number and/or any other type of depth and/or texture sensing unit. As such, the embodiments are not limited to only those units shown in FIG. 1.

Figure 2:
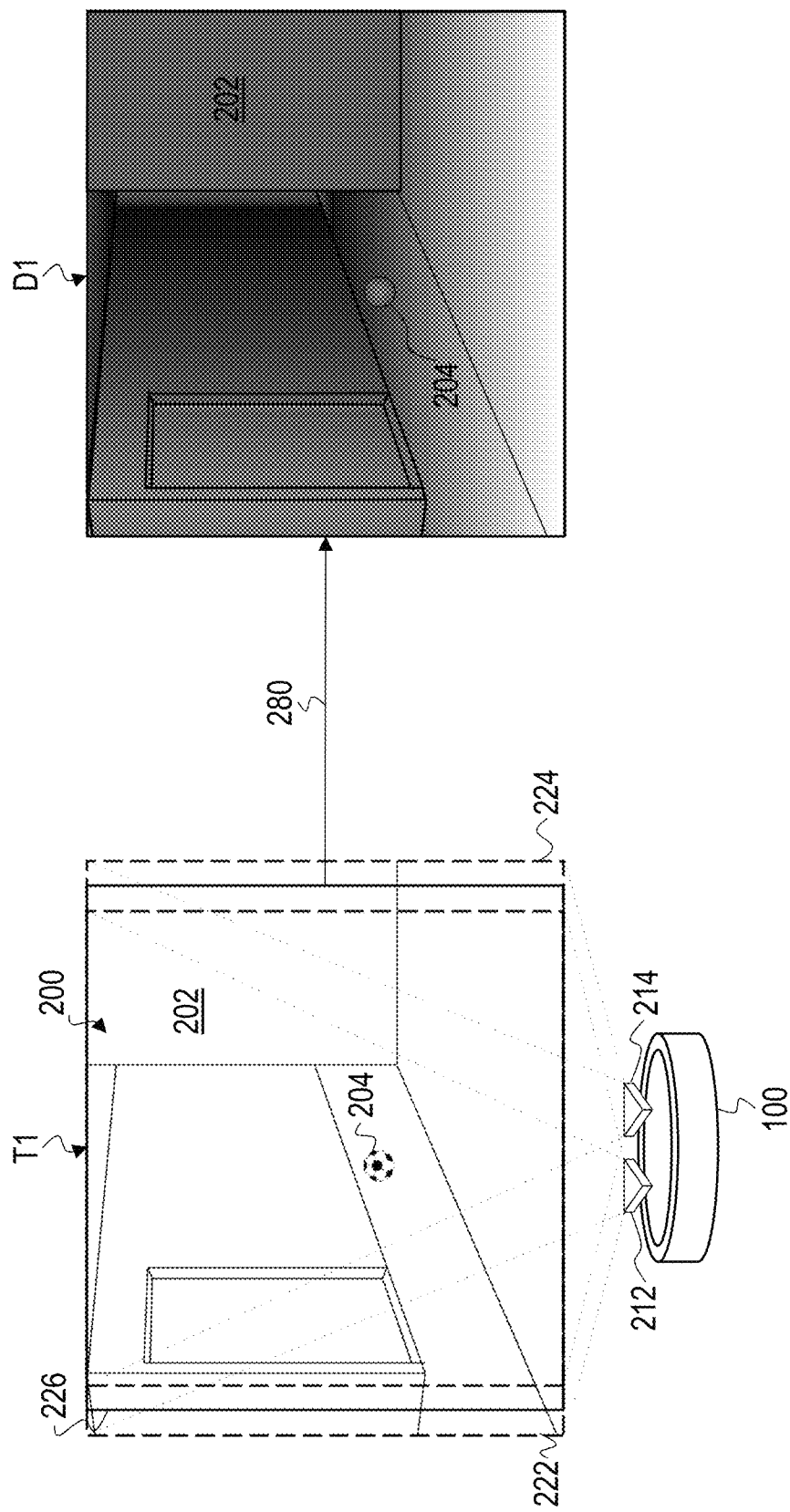
FIG. 2 provides an example illustration of a mixed-reality system obtaining texture data and depth data associated with a real-world environment.

FIG. 2 provides an example illustration of an HMD 100 system obtaining texture data and depth data associated with a real-world environment 200 (in this case, an interior of a building that includes walls, such as wall 202, and a movable object shown as a ball 204). In the embodiments described hereinbelow with reference to FIGS. 2-6, the HMD 100 includes scanning sensor(s) 105 that include a stereoscopic depth camera system 110. However, it will be appreciated that the particular configuration described in FIGS. 2-6 is illustrative only, and non-limiting. For example, the principles disclosed referring to the particular HMD configuration described in FIGS. 2-6 may be practiced in other computer system configurations (e.g., utilizing a TOF system and separate RGB camera).

As shown in FIG. 2, the stereoscopic depth camera system 110 of the HMD 100 includes a left camera 212 and a right camera 214 that are arranged to capture different perspectives of a real-world environment 200 (represented in FIG. 2 by the dashed lines extending from the left camera 212 to a left portion 222 of the real-world environment 200 and from the right camera 214 to a right portion 224 of the real-world environment 200). The left camera 212 and the right camera 214 are thus configured to capture an image pair of the real-world environment 200 that includes a left image of the left portion 222 and a right image of the right portion 224. As illustrated, the different perspectives captured by the left camera 212 and the right camera 214 also include an overlapping region 226 that is captured by both the left camera 212 and the right camera 214.

It should briefly be noted that the left-right configuration of the cameras of the scanning sensor(s) 105 shown in FIG. 2 is illustrative only and other configurations (e.g., top-bottom) are within the scope of this disclosure.

Based on at least the left image, the right image, and/or the overlapping region 226, the HMD 100 determines texture information associated with the real-world environment 200. The texture information may include visual attributes/characteristics of any objects represented in the real-world environment 200. For example, the texture information may include the pattern of the ball 204 and/or the texturing of the wall 202. Based on the texture information, the HMD 100 generates a texture map T1 of the real-world environment 200. The texture map T1 may be conceptualized, in 3D modeling terms, such as with a u-v map that includes the texturing of the various objects of the real-world environment 200. In this regard, the HMD 100 utilizes scanning sensor(s) 105 (here, including left camera 212 and right camera 214) to obtain a texture map T1 of the real-world environment 200 that is based on an image pair obtained by a pair of stereo cameras.

FIG. 2 also includes a representation of an HMD 100 obtaining a depth map D1 of the real-world environment 200. In some implementations, the HMD 100 obtains the depth map D1 by performing stereo matching on the image pair obtained by the left camera 212 and the right camera 214 (indicated by the arrow 280 extending from the overlapping region 226 to the depth map D1). As noted above, the overlapping region 226 is a region of the real-world environment 200 that is captured by both the left camera 212 and the right camera 214. Stereo matching may include, for instance, rectifying the images of the image pair (e.g., causing scanlines of the images to be aligned) and determining a per-pixel disparity between corresponding left- and right-image pixels by comparing the relative positions of corresponding left and right pixel patches centered around the corresponding left- and right-image pixels. The HMD 100 may generate a depth map D1 based on the determined per-pixel disparity values.

The depth map includes depth information related to the positions, geometries, and/or shapes of real-world objects positioned within the real-world environment 200. In FIG. 2, the depth information of the depth map D1 is represented in the form of gradients shown on the various surfaces of the objects in the real-world environment 200, with darker gradients representing larger depth values (e.g., a greater distance from the scanning sensor(s) 105). For example, the wall 202 includes a substantially uniform depth from the scanning sensor(s) 105, whereas the middle portion of the ball 204 is shown as being closer to the scanning sensor(s) 105 than the edges of the ball 204. As shown, the texture information present in the texture map T1 is absent from the depth map D1 (e.g., the pattern of the ball 204 is absent in the depth map D1).

It will be appreciated that D1 is only one example of a depth map and that the scope of this invention applies to all types of depth maps that may be obtained for an image corresponding to a real-world environment and a related texture map of the real-world environment and which may be combined with the texture map to generate a virtual representation of the real-world environment.

The texture map T1 and the depth map D1 may be generated/obtained based on a single image pair (e.g., captured by left camera 212 and right camera 214). The texture map T1 and/or the depth map D1 may be stored locally and/or in a remote repository (e.g., a cloud storage system). As will be described in more detail hereinafter, the texture map T1 and the depth map D1 may be combined to form a virtual representation of the real-world environment 200 that becomes presented to a user as part of facilitating an HMD pass-through experience.

It should also be noted, as mentioned above, that depth calculation through stereo matching is generally regarded as a computationally expensive process. For instance, the processes of rectifying the images of the image pair and, for each pixel, scanning the scanlines of the images for matching pixel patches to determine disparity for generating the depth map may cause perceivable latency in the process of generating and presenting successive virtual representations of the real-world environment, particularly if an updated texture map cannot be obtained/stored until depth processing to generate a depth map for combination with a previously acquired texture map has completed. Excessive latency may result in an undesirable, choppy mixed-reality pass-through experience.

Accordingly, FIGS. 3A-3D illustrate conceptual representations of a mixed-reality system (e.g., HMD 100) combining texture data (T1, T2, T3, etc.) and depth data (D1, D2, D3, etc.) to generate virtual representations of the real-world environment 200 in a manner that reduces the effects of latency associated with depth processing described hereinabove. It should initially be noted that FIGS. 3A-3D include numerous elements, and that reference numerals are omitted from at least some of the elements for clarity.

FIG. 3A provides an illustration of an HMD 100 obtaining a plurality of texture maps (T1, T2, T3, etc.) and depth maps (D1, D2, D3, etc.) over time (a time axis t is shown in FIGS. 3A-3D). The HMD 100 corresponds with the HMD 100 described with reference to FIG. 2. In particular, the HMD includes a stereo camera pair for capturing image pairs from which to calculate texture maps and depth maps. As shown, the HMD 100 can use a single image pair to generate both a texture map and a depth map, as indicated by dashed box 302 surrounding texture map T1 and a dashed representation of depth map D1. The dashed representation of depth map D1 indicates a beginning of depth processing on the received image pair (e.g., a beginning of a stereo matching process). As shown in FIG. 3A, dashed arrow 304 extends from the dashed representation of depth map D1 to the solid or final representation of depth map D1 (referred to herein simply as "depth map D1"), indicating the temporal displacement between the beginning of depth processing and the end of depth processing (resulting in depth map D1).

FIG. 3A does not show a temporal displacement between the beginning and end of texture map processing. For instance, no dashed representation of texture map T1 is shown in FIG. 3A, but rather only a final, solid representation of texture map T1 is shown within the dashed box 302, suggesting that texture map processing may be performed, in some instances, much faster than depth map processing.

As noted above, depth map processing may be more computationally intensive than texture map processing, which may cause depth map generation to take longer than texture map generation. Accordingly, latency may exist in mixed-reality pass-through systems that sequentially present virtual representations of real-world environments based on texture maps and depth maps that were generated from the same image pair (e.g., presenting a virtual representation of an environment based on texture map T1 combined with the depth map D1, even though it takes longer to process depth map D1 than texture map T1, as shown in FIG. 3A). Put differently, the excessive time it may take to perform depth processing may slow down the presentation framerate for a mixed-reality pass-through experience that presents, resulting in presentation lag, and which can further necessitate expensive LSR, more than would otherwise be required without the presentation lag.

Accordingly, to increase the likelihood of providing a smooth pass-through experience, an HMD 100 of the present disclosure may perform depth processing (e.g., stereo matching) as an asynchronous process with reduced lag in the image processing. In some implementations, upon receiving an image pair from a pair of stereo cameras, an HMD 100 may perform texture processing and depth processing in at least two distinct computing centers. The computing centers may take on any form, such as one or more cores of a processing unit (e.g., a CPU), system-on-a-chip (SOC), and/or an application-specific integrated circuit (ASIC), for example. Additional details concerning hardware processing units are discussed hereinafter.

In some implementations, the HMD 100 concurrently utilizes one processing center (e.g., an SOC) to perform texture processing and another processing center (e.g., of the same SOC and/or of an off-board ASIC) to perform depth processing. By performing texture and depth processing as asynchronous processes, the HMD 100 may obtain additional updated texture maps (e.g., texture maps T2, T3, T4, etc., obtained after texture map T1), while simultaneously performing depth processing to obtain a depth map (e.g., depth map D1).

By way of example, as shown in FIG. 3A, the HMD 100 obtains texture map T2 (e.g., an updated texture map) subsequent to the obtaining of texture map T1 and while depth processing is being asynchronously performed to obtain depth map D1 (as indicated by dashed arrow 304). Additionally, the HMD 100 obtains another texture map T3 near the same time that depth map D1 becomes completed (e.g., fully obtained), and the HMD 100 continues to obtain newly updated texture maps (e.g., T4, T5, T6) subsequent to obtaining the depth map D1. Since this newly updated texture maps are received in close proximity to the timing of the obtaining of depth map D1, they are still relevant.

While successively obtaining newly updated texture maps (e.g., T4, T5, T6), the HMD 100 also may begin to asynchronously obtain an updated depth map with a different image pair. For instance, the dashed representation of depth map D2 is shown along with texture map T4 within dashed box 306, indicating that both depth map D2 and texture map T4 will be generated based on the same image pair (e.g., from a stereo camera pair). The HMD 100 obtains additional newly updated texture maps (e.g., T5, T6) while the HMD 100 asynchronously performs depth processing to obtain depth map D2, and so on.

Accordingly, the HMD 100 may obtain texture maps at one frequency (e.g., a first frequency) and depth maps at another frequency (e.g., a second frequency). Because the depth processing may take longer than the texture processing, the frequency at which the HMD 100 obtains updated texture maps may be higher than the frequency at which the HMD 100 obtains updated depth maps. The depth maps, which are obtained at a lower frequency, may then be applied with the texture maps, which are obtained at a higher frequency, for full reprojection of camera images. As described in more detail hereafter, head tracking poses may be used to accommodate for any adjustments in the changes in head position from frame to frame.

In the representation shown in FIG. 3A, the HMD 100 obtains depth maps at a rate that is 1/3 the rate at which the HMD 100 obtains texture maps. In some implementations, the HMD 100 obtains texture maps at a rate of 90 Hz while asynchronously obtaining depth maps at a rate of 30 Hz. In other examples, the HMD may obtain texture maps and depth maps at rates of 45 Hz and 15 Hz, 120 Hz and 40 Hz, 150 Hz and 50 Hz, or 60 Hz and 180 Hz (respectively), or any range therebetween.

In this regard, the HMD 100 refrains from obtaining a depth map for every texture map that the HMD 100 obtains, which may prevent the framerate of a mixed-reality pass-through experience from being throttled or otherwise limited by the time it takes to perform depth processing.

Continuing, in some embodiments, the HMD 100 generates virtual representations of the real-world environment by combining texture maps with depth maps. For example, the HMD 100 may apply the texture information contained in the texture maps to the geometries of the reconstructed surfaces and represented in the depth maps. However, in some implementations, as shown in FIG. 3A by the arrows extending from the texture maps (e.g., T4, T5, T6, T7, T8, T9) to the depth maps (e.g., D1, D2), the HMD 100 does not apply a particular texture map to a depth map that was generated based on the same image pair as the particular texture map. Rather, in some embodiments, the HMD 100 applies each newly updated texture map to the most recently obtained updated depth map to generate and/or render a virtual representation or scene of the real-world environment. Put differently, the HMD 100 may generate mixed-reality pass-through scenes utilizing a depth map and an updated texture map, rather than a texture map that was obtained based on the same image pair as was used to generate the depth map.

For example, texture map T4 and depth map D2 are based on a same image pair, and depth processing begins on D2 near the same time that the texture map T4 is obtained (as indicated by dashed box 306). At the HMD 100 obtains texture map T4, the most recently obtained depth map is depth map D1, rather than depth map D2 (which is still being generated/obtained by the HMD 100, as indicated by dashed arrow 308). Rather than waiting for depth processing to finish to obtain depth map D2 (e.g., denoted by the solid representation of depth map D2), the HMD 100 applies the texture map T4 to the previously obtained depth map D1 in order to render a virtual representation of a real-world environment for presentation/display to a user (as represented in FIG. 3A by the arrow 310 extending from texture map T4 to depth map D1).

The HMD 100 obtains texture maps T5 and T6 after depth processing has begun but before depth processing has completed to obtain depth map D2. Accordingly, depth map D1 is still the most recently obtained depth map, so the HMD 100 also applies texture maps T5 and T6 to the depth map D1 to generate an HMD pass-through scene (e.g., as indicated by arrows 312 extending from texture maps T5 and T6 to depth map D2), rather than waiting until depth map D2 is obtained.

After depth processing completes for depth map D2, D2 becomes the most recently obtained depth map, so the HMD 100 applies newly updated texture maps obtained after the completion of depth map D2 to depth map D2 (e.g., texture maps T7, T8, and T9). This process may repeat indefinitely (e.g., as indicated by ellipses 314). In this way, for example, the HMD 100 may provide a smooth HMD mixed-reality pass-through experience, despite the computational burden and/or high latency associated with depth processing to generate a depth map.

Although FIG. 3A has described embodiments in which the HMD 100 applies newly updated/obtained texture maps to the most recently obtained texture map, it should be noted that this configuration is illustrative only. For instance, FIG. 3B shows an implementation in which the HMD 100 applies a texture map (e.g., texture map T7) to a depth map that is not the most recently obtained depth map (e.g., to depth map D1, rather than the more recently obtained depth map D2).

Additionally, it should be noted that the frequencies shown for texture map acquisition and depth map acquisition shown in FIG. 3A are provided as an example only. In other instances (e.g., as shown in FIG. 3C), the HMD 100 generates depth maps at a rate that is ½ the rate at which the HMD 100 obtains texture maps. By way of non-limiting example, an HMD 100 may generate depth maps and texture maps at rates of 15 Hz and 30 Hz, 30 Hz and 60 Hz, 45 Hz and 90 Hz, 60 Hz and 120 Hz, or 90 Hz and 180 Hz (respectively).

Furthermore, it should be noted that depth map acquisition rates, as well as other aspects of a system for providing a mixed-reality pass-through experience, may be predefined or dynamically and/or intelligently updated. For instance, FIG. 3D shows an example of a HMD 100 that dynamically changes whether to apply a texture map to a most recently obtained depth map to generate a pass-through scene, or to apply the texture map to a depth map that was obtained prior to the most previously obtained depth map. As shown in FIG. 3D, the HMD 100 applies texture map T4 to a most recently obtained depth map D1, whereas the HMD 100 applies texture map T7 to depth map D2 which, at the time texture map T7 is obtained, is not the most recently obtained depth map (i.e., depth map D3).

FIG. 3D also demonstrates that an HMD 100 may dynamically update the rate at which the HMD 100 obtains depth maps. For example, the HMD 100 obtains depth map D1 at a rate that is ⅓ the rate of texture map acquisition (e.g., similar to the embodiments described with reference to FIGS. 3A and 3B), the HMD 100 obtains depth map D2 at a rate that matches the rate of texture map acquisition, the HMD 100 obtains depth map D3 at a rate that is ½ the rate of texture map acquisition (e.g., similar to the embodiment described with reference to FIG. 3C), and the HMD 100 obtains depth map D4 at a rate that is ¼ the rate of texture map acquisition.

An HMD 100 may alter the rate at which the HMD 100 obtains depth frames based on a variety of criteria. In some embodiments, the HMD 100 dynamically updates the frequency of depth map acquisition based on a change in a position of the HMD 100 relative to the real-world environment. Additional details concerning dynamically updating the frequency for obtaining depth maps will be discussed with reference to FIGS. 5A and 5B.

It should furthermore be noted that an HMD 100 need not begin obtaining another depth map immediately after obtaining a previous depth map. For example, FIG. 3D shows that, after obtaining depth map D4, the HMD 100 waits to begin obtaining depth frame D5 until after an intervening texture frame T11 has been obtained.

Figure 4:
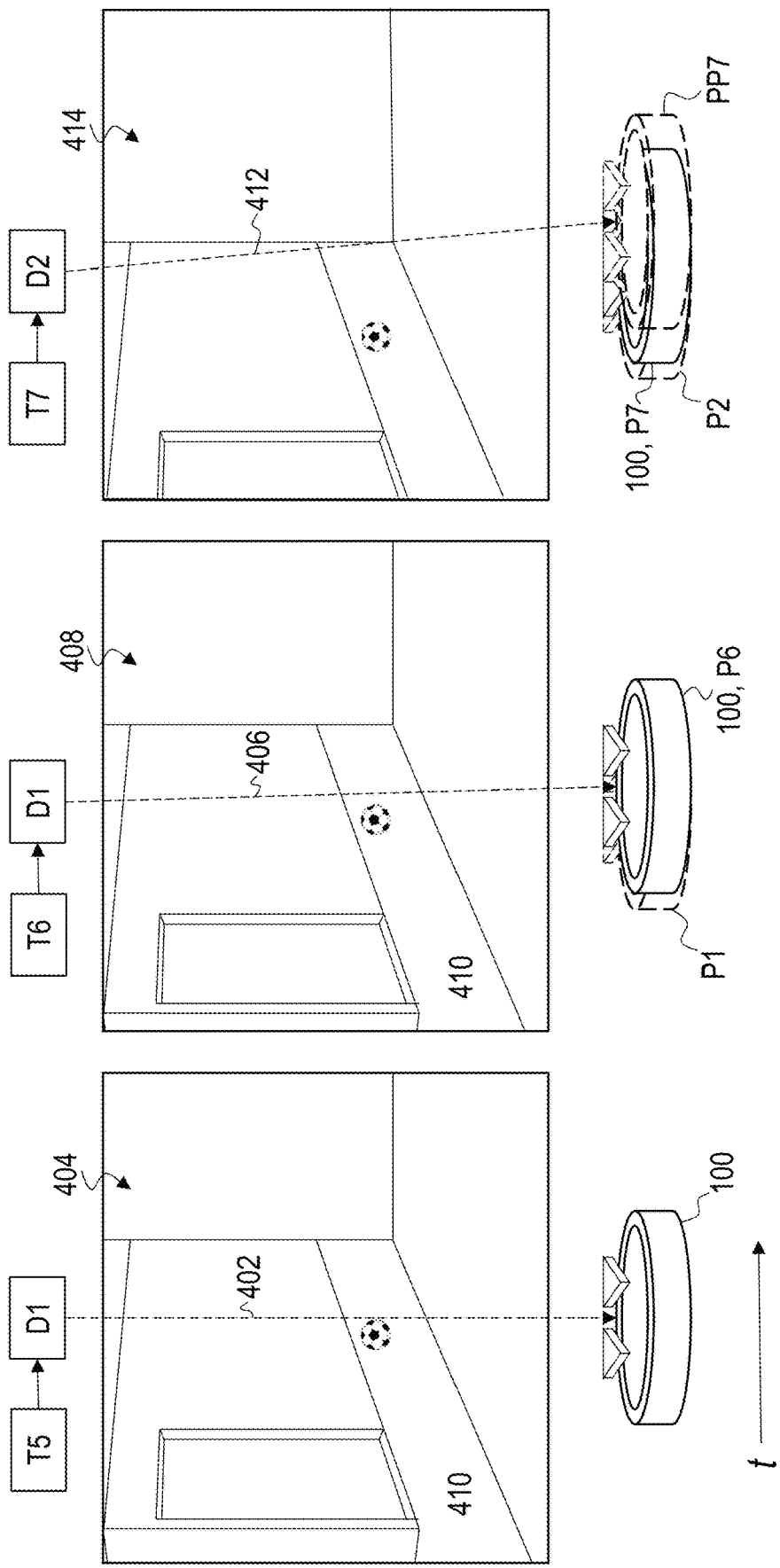
FIG. 4 provides an example illustration of a mixed-reality system displaying a virtual representation of the real-world environment while accounting for changes in user perspective.

FIG. 4 provides an example illustration of an HMD 100 displaying a virtual representation of the real-world environment while accounting for changes in user perspective. As noted above, an HMD 100 may generate and/or render a virtual representation of a real-world environment by mapping the texture information of the texture maps onto the surface reconstruction mesh of the depth maps. For reference, FIG. 4 includes references to texture maps (e.g., T5, T6, and T7) and depth maps (e.g., D1 and D2) that were described in FIG. 3A. FIG. 4 also includes a time axis to indicate the temporal relationship between the various instances shown in FIG. 4.

As is conceptually represented in FIG. 4, the HMD 100 combines the texture map T5 with the depth map D1 to provide a virtual representation of the real-world environment 404. In the instance shown, the depth map D1 is a depth map that was generated based on an image pair that was also utilized to generate texture map T1 (see FIG. 3A). As such, the image pair used to acquire depth map D1 is temporally offset from the image pair used to generate texture map T5. Put differently, depth map D1 applies to an instance in time that is previous to the instance in time to which texture map T5 is applicable.

In the instance shown with respect to texture map T5 and depth map D1, the perspective of the HMD 100 has persisted (e.g., not changed) between the time that the HMD 100 initiated depth to obtain depth map D1 and the time that the HMD 100 obtained texture map T5 and applied texture map T5 to depth map D1 to provide a virtual representation of the real-world environment 404 for display (as indicated by dashed arrow 402). However, the perspective of the HMD 100 may change between the time that depth processing begins to obtain a depth map and the time that texture maps will be applied to the depth map to provide a virtual representation of the real-world environment to a user. Such intervening changes in perspective can give rise to distortions and/or inaccuracies in the pass-through scene ultimately displayed to a user on the HMD 100.

Accordingly, in some instances, the HMD 100 may generate/render a virtual representation of the real-world environment in a manner that accounts for changes in user perspective (e.g., the perspective of the HMD). As shown in FIG. 4 with respect to texture map T6 and depth map D1, position P1 is a position of the HMD 100 that existed at the time that the HMD began depth processing to obtain depth map D1. However, the position of the HMD 100 has shifted from position P1 to position P6, which is the positioning of the HMD 100 at the time that the HMD 100 is prepared to apply texture map T6 to depth map D1 to render a virtual representation of the real-world environment.

To compensate for the change in perspective of the HMD 100, the HMD 100 may perform Late Stage Reprojection (LSR). This process may include detecting a predicted pose of a user (e.g., a user wearing the HMD 100) and reprojecting an image based on that pose. For instance, in some instances, the HMD 100 obtains data associated with the position of the HMD 100 (e.g., head tracking data) to determine a position that the HMD 100 will be in at the time the virtual representation of the real-world environment will be displayed on the HMD 100. The position data associated with the HMD 100 may include various types of data, such as location data obtained by a camera system (e.g., a head tracking camera system), and/or motion or position data obtained by an inertial measurement unit (IMU), gyroscopes, accelerometers, global positioning systems (GPS), etc., for indicating a velocity, acceleration, and/or position of the HMD 100.

Based on the updated or predicted pose of the HMD 100, the HMD 100 may reproject at least a portion of the depth map to correspond with a user perspective associated with the updated or predicted pose of the HMD 100. In some embodiments, the reprojection may include applying one or more transformations (e.g., a translation, rotation, point shifting) of one or more geometries of the reconstructed surfaces represented in the depth map. The reprojection may cause the positioning and/or depths of the objects represented in the depth map to at least partially emulate an appearance that the objects would have if viewed from the updated user perspective associated with the updated or predicted pose.

Returning to the example concerning texture map T6 and depth map D1, the HMD 100 obtains tracking data associated with the positional change in the HMD 100 from position P1 to position P6, indicating that the HMD 100 will be positioned at position P6 at the time that a virtual representation of the real-world environment will be displayed by the HMD 100. Based on the tracking data, the HMD 100 reprojects the depth map D1 to conform to the user perspective associated with the updated position P6 of the HMD 100 (e.g., as indicated by dashed arrow 406). The HMD 100 then maps the texture information of the texture map T6 onto the reprojected depth map D1 to render the virtual representation of the real-world environment 408. In this regard, a predicted pose may include a current, updated pose of the HMD 100.

As is evident in FIG. 4, virtual representation of the real-world environment 408 includes shifted features as compared with virtual representation of the real-world environment 404. For instance, a smaller portion of wall 410 is visible in virtual representation of the real-world environment 408 as compared with virtual representation of the real-world environment 404 (e.g., by reason of the rightward shift in the HMD 100 perspective from position P1 to position P6).

In another example, as shown in FIG. 4 with respect to texture map T7 and depth map D2, the HMD 100 obtains tracking data associated with the positional change in the HMD 100 from position P2 to position P7 (position P2 corresponding with an HMD 100 position when depth processing began to obtain depth map D2 and position P7 corresponding with a position of the HMD 100 when the HMD 100 obtained texture map T7).

The tracking data may indicate that the position of HMD 100 will change to predicted pose PP7 in the time that intervenes between the combining of texture map T7 with depth map D2 to form/render a pass-through scene and the displaying of the pass-through scene on the HMD. For example, the tracking data may show that the HMD 100 has a high acceleration or velocity and will therefore likely be position with predicted pose PP7 when a virtual representation of the real-world environment will be displayed on the HMD 100. Therefore, based on the predicted pose PP7, the HMD 100 reprojects the depth map D2 to conform to the user perspective associated with the predicted pose PP7 of the HMD 100 (e.g., as indicated by dashed arrow 412). The HMD 100 then maps the texture information of the texture map T7 onto the reprojected depth map D2 to render and present the virtual representation of the real-world environment 414.

As is evident in FIG. 4, virtual representation of the real-world environment 414 includes shifted features as compared with virtual representation of the real-world environment 408. For instance, wall 410 is not visible in virtual representation of the real-world environment 414 (e.g., by reason of the rightward shift in the HMD 100 perspective from position P1 to position P7, giving rise to predicted pose PP7).

In view of the foregoing, reprojecting the depth maps to conform to predicted user perspectives/poses may ameliorate errors that would otherwise result because of the temporal displacement between the depth maps and texture maps that are combined to form virtual representations of real-world environments.

Figure 5A:
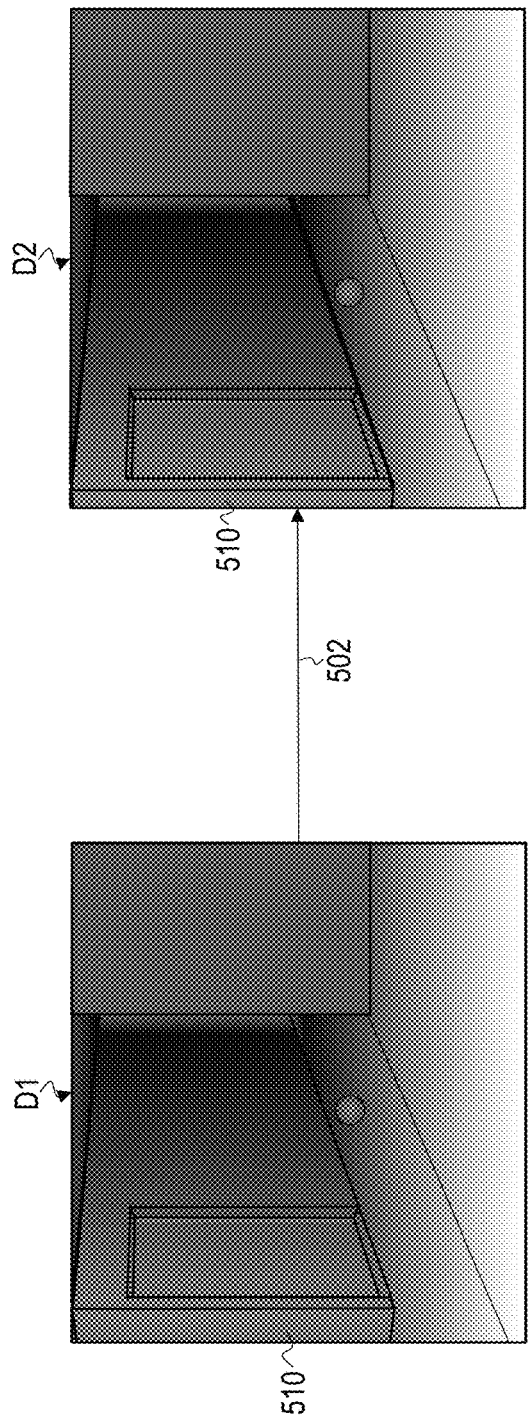
FIGS. 5A and 5B provide example illustrations of triggering conditions for selectively altering a depth data generation.
Figure 5B:
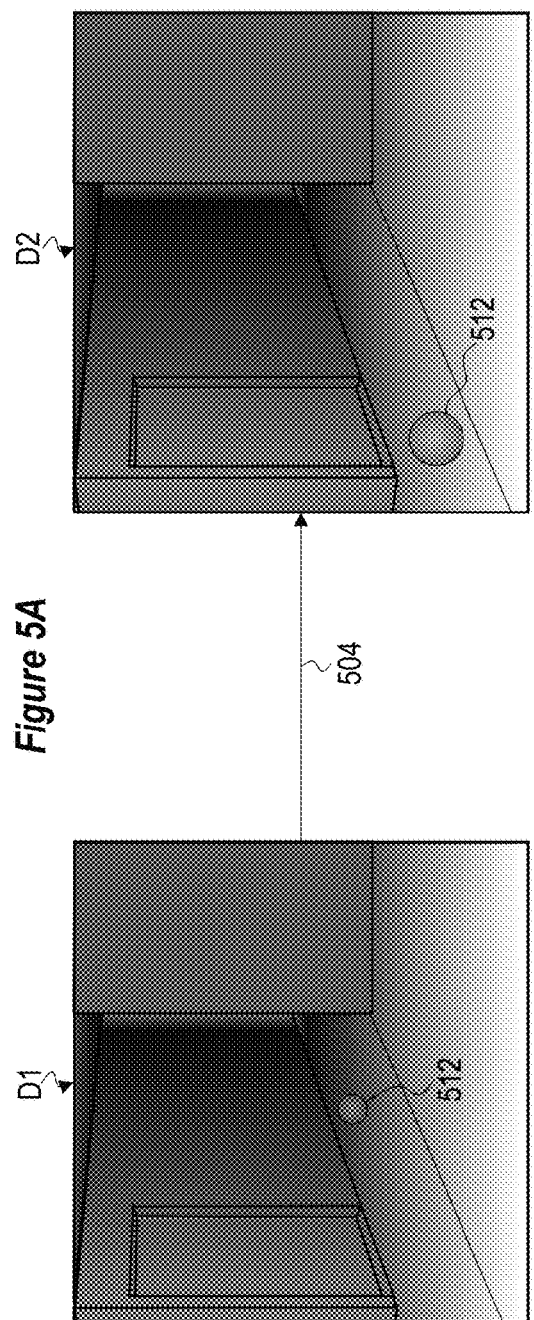

FIGS. 5A and 5B provide example illustrations of triggering conditions for selectively altering a frequency at which an HMD 100 generates depth information/depth maps. As noted above, in some embodiments, the HMD 100 dynamically updates the frequency of depth map acquisition based on a change in a position of the HMD 100 relative to the real-world environment. The HMD 100 may detect a change in a position of the HMD 100 with respect to the real-world environment in a variety of ways. For example, as described with reference to FIG. 4, the HMD 100 may obtain tracking data (e.g., head tracking data) to detect changes in the positioning of the HMD 100.

A change in the pose of the HMD 100 may cause portions of real-world objects that were not previously visible to the user to become visible within the user's new field of view. Therefore, in some implementations, the HMD 100 increases the frequency with which the HMD 100 obtains depth maps in response to detecting a change in the pose of the HMD 100 (e.g., in order to more accurately capture the changes in the user's perspective/perception of the real-world environment).

Additionally, or alternatively, the HMD 100 may detect changes in the position of the HMD 100 relative to the real-world environment based on changes in the surface reconstruction meshes of the depth maps. A difference in the depth information of two sequential depth maps may also indicate that the perspective of the HMD 100 is changing with respect to at least a portion of the real-world environment.

By way of example, FIG. 5A illustrates a first depth map D1 and a second depth map D2. The HMD 100 obtains the second depth map D2 after obtaining the first depth map D1 (as indicated by the arrow 502 extending from the first depth map D1 to the second depth map D2). As shown, differences exist in the surface reconstruction mesh shown in the second depth map D2 as compared with the first depth map D1. For example, a smaller portion of the wall 510 is included in the surface reconstruction mesh of the second depth map D2 as compared against the first depth map D1. Upon detecting this change, the HMD 100 may determine that the HMD 100 may continue to change its position with respect to the real-world environment and/or selectively increase the frequency at which the HMD 100 obtains depth maps in order to accommodate potential future changes in the perspective of the HMD 100.

It will be appreciated that an HMD 100 may analyze any number of depth maps (e.g., 3 or more depth maps) in order to assess differences in depth information and/or to assess a rate at which differences between depth maps materialize (e.g., by analyzing the magnitude of differences between depth maps and the time period in which the differences were introduced).

It should be noted that the position of the HMD 100 relative to the real-world environment also changes when objects within the real-world environment change position within the environment. For instance, FIG. 5B also shows a first depth map D1 and a second depth map D2. The HMD 100 obtains the second depth map D2 after obtaining the first depth map D1 (as indicated by the arrow 504 extending from the first depth map D1 to the second depth map D2).

As shown, differences exist in the surface reconstruction mesh shown in the second depth map D2 as compared with the first depth map D1. For example, the position of the ball 512 is different in the second depth map D2 as compared with the first depth map D1. Upon detecting this difference, the HMD 100 may determine that one or more objects within the real-world environment may continue to change positions with respect to the HMD 100 and/or selectively increase the frequency at which the HMD 100 obtains depth maps in order to accommodate potential future changes in the real-world.

Similarly, an HMD 100 may also determine that a new real-world object is present in an updated depth map that was not present in a previously obtained depth map and therefore increase or decrease the depth map acquisition frequency. Also, an HMD 100 may also determine that a previously present real-world object is no longer present in an updated depth map that was present in a previously obtained depth map and therefore increase or decrease the depth map acquisition frequency.

Those skilled in the art will recognize that, conversely, the HMD 100 may selectively decrease the frequency at which the HMD 100 obtains depth maps based on any of the criteria described hereinabove, such as detecting, by tracking data, that a position of the HMD 100 relative to the real-world environment ceases to change and/or has a low (or decreasing) rate of change, and/or detecting a lack of differences (or a slow rate of changing) between obtained depth maps.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
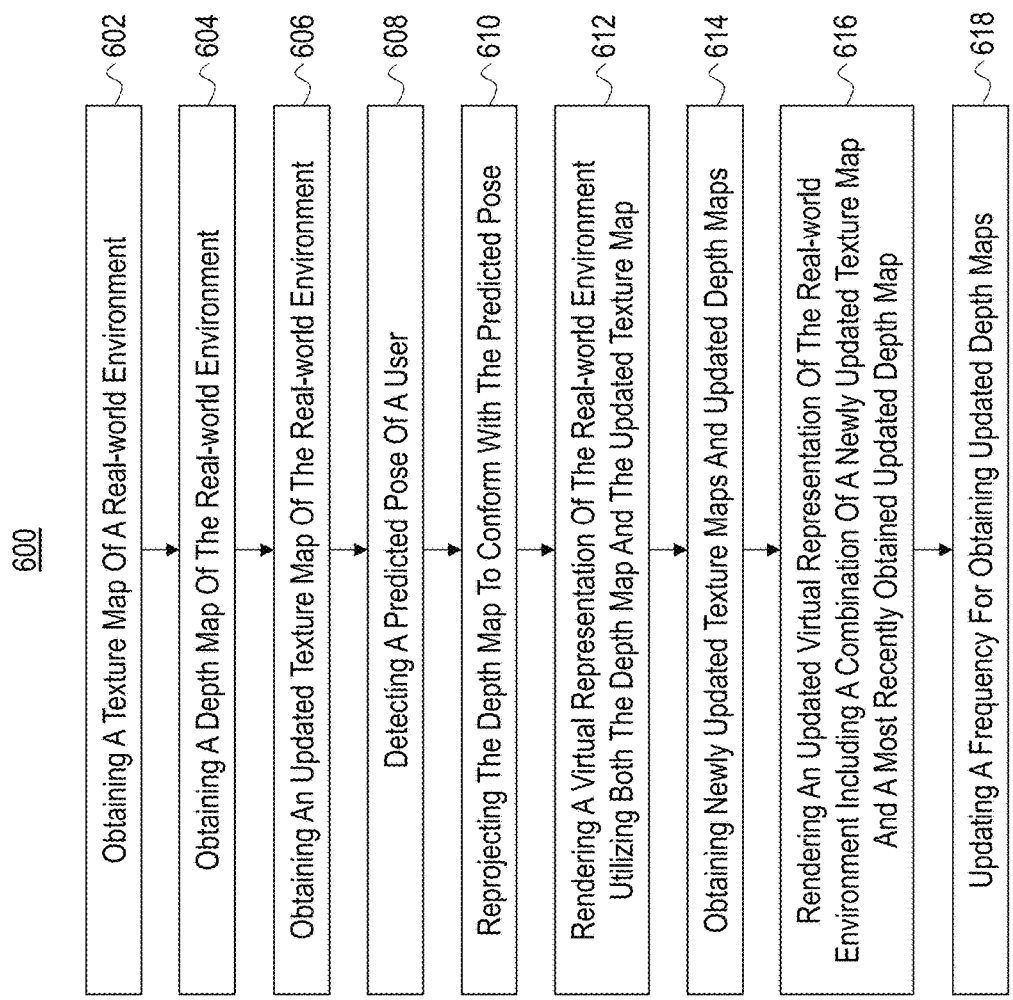
FIG. 6 illustrates an example flow diagram depicting a method for providing a mixed-reality pass-through experience, according to the present disclosure.

As shown in FIG. 6, a flow diagram 600 is provided with various acts associated with methods for providing a mixed-reality pass-through experience. The discussion of the various acts represented in flow diagram 600 includes references to various hardware components described in more detail with reference to FIGS. 1 and 7.

The first illustrated act is an act of obtaining a texture map of a real-world environment (act 602). Act 602 is performed, in some instances, utilizing a camera system 110, 140 of scanning sensor(s) 105 of a texture system 715 of an HMD 100 (or other computer system 700). In some implementations, the texture map is based on an image pair obtained from a pair of stereo cameras (e.g., of a stereoscopic depth camera system 110). In some cases, the stereo pair of images is used to generate a depth map, which is then used to perform any of the reprojection operations discussed herein.

The second illustrated act an act of obtaining a depth map of the real-world environment (act 604). Act 604 is performed, in some instances, by a depth system 720 of a computer system 700 (e.g., an HMD 100). In some implementations, the texture map described as pertaining to act 602 is obtained based on the same image pair that is utilized to obtain the depth map of the real-world environment. The depth map may be obtained at least in part by performing stereo matching on the image pair. In some embodiments, the stereo matching is performed as an asynchronous process (e.g., within separate computing centers).

The third illustrated act is an act of obtaining an updated texture map of the real-world environment (act 606). The updated texture map may be obtained by a texture system 715 subsequent to the obtaining of the depth map and the texture map.

The fourth illustrated act is an act of detecting a predicted pose of a user (act 608). Act 608 is performed, in some instances, utilizing sensor(s) 740, 765, and/or I/O interfaces for detecting user gestures and/or movement. For example, a computer system (e.g., an HMD 100) may detect a predicted pose based on head tracking data.

The fifth illustrated act is an act of reprojecting the depth map to conform with the predicted pose (act 610). The reprojection may be performed by any processing center of a computer system 700 (e.g., processor(s) 705, ML engine 710, graphics rendering engine(s) 725, etc.) to transform one or more geometries of one or more reconstructed surfaces represented in the depth map such that the geometries of the one or more reconstructed surfaces take on new geometries that correspond with a user perspective that is associated with the perspective.

The sixth illustrated act is an act of rendering a virtual representation of the real-world environment utilizing both the depth map and the updated texture map (act 612). In some embodiments, rather than using a texture map that was obtained based on the same image pair utilized to obtain the depth map, a system (e.g., computer system 700, HMD 100) utilizes the updated texture map that was obtained subsequent to the depth map to which the updated texture map becomes combined to form the virtual representation of the real-world environment. Act 612 may be performed, for example, by the graphics rendering engine(s) 725 of the computer system 700. In some instances, a display system 730 presents the rendered virtual representation of the real-world environment to a user.

The seventh illustrated act is an act of obtaining newly updated texture maps and updated depth maps (act 614). Act 614 is performed, in some implementations, by texture system 715 and depth system 720. The newly updated texture maps and the updated depth maps may be obtained at different frequencies. For instance, the texture system 715 may obtain the newly updated texture maps at a first frequency, and the depth system 720 may obtain the updated depth maps at a second frequency. In some embodiments, the second frequency is less than the first frequency (e.g., because of the computational burden associated with performing depth processing, such as stereo matching). In one example, the first frequency is 90 Hz, and the second frequency is 30 Hz.

The eighth illustrated act is an act of rendering an updated virtual representation of the real-world environment including a combination of a newly updated texture map and a most recently obtained updated depth map (act 616). In some instances, the most recently obtained depth map is a depth map that was obtained prior to the obtaining of the particular newly updated texture map that becomes combined with the most recently obtained depth map.

The ninth illustrated act is an act of updating a frequency for obtaining updated depth maps (act 618). In some embodiments, a computer system 700 (e.g., HMD 100) dynamically updates the frequency for obtaining depth maps based on a change in a position of the computer system 700 (e.g., the HMD 100) relative to the real-world environment. In some instances, the change in position of the computer system 700, or a part of the real-world environment (e.g., an object therein), is detected by sensor(s) 740, 770, and/or I/O interfaces 735 by detecting tracking data associated with the computer system 700 (e.g., positional data, such as head tracking data that indicate a position of an HMD), and/or by calculating differences between updated depth maps (e.g., using depth system 720 and/or any computing center of the computer system 700). The frequency for obtaining depth maps may be increased, decreased, or remain unchanged based on detected changes in the position of the computer system 700 with respect to the real-world environment.

Although the foregoing description has focused on a mixed-reality pass-through experience implemented on a VR HMD, those skilled in the art will recognize that at least some of the embodiments and principles disclosed herein may be implemented in AR systems.

Figure 7:
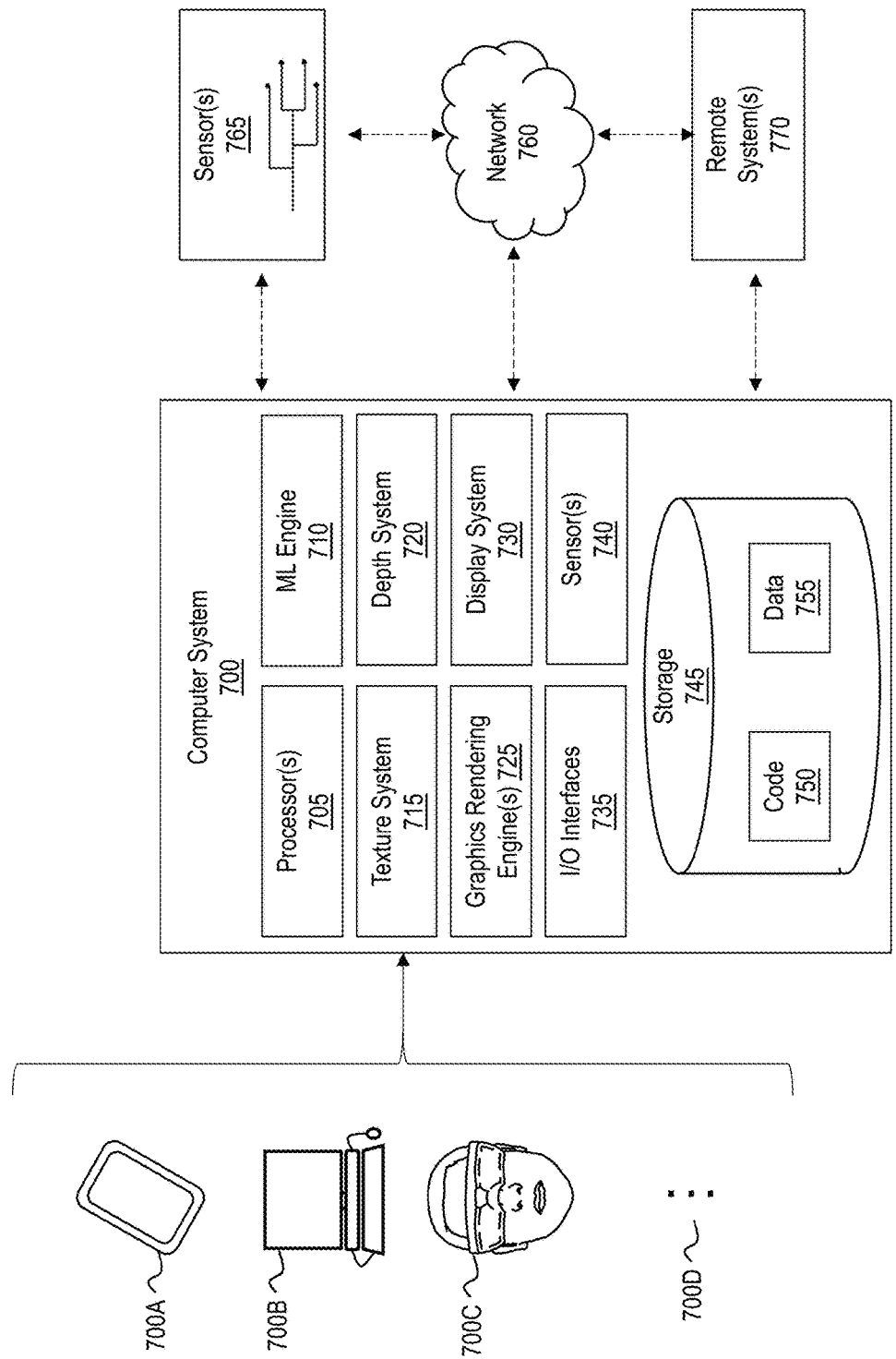
FIG. 7 illustrates an example computer system and components thereof that may comprise, be incorporated with and/or used to implement one or more operations disclosed herein.

Having just described the various features and functionalities of some of the disclosed embodiments, the focus will now be directed to FIG. 7 which illustrates an example computer system 700 that may be used to facilitate the operations described herein. In particular, this computer system 700 may be implemented as part of a mixed-reality HMD, as noted hereinabove.

Computer system 700 may take various different forms. For example, computer system 700 may be embodied as a tablet, a desktop, a laptop, a mobile device, a cloud device, an HMD, or a standalone device, such as those described throughout this disclosure. Computer system 700 may also be a distributed system that includes one or more connected computing components/devices that are in communication with computer system 700. FIG. 7 specifically calls out how computer system 700 may be embodied as a tablet 700A, a laptop 700B, or an HMD 700C, but the ellipsis 700D illustrates how computer system 700 may be embodied in other forms as well.

In its most basic configuration, computer system 700 includes various different components. FIG. 7 shows that computer system 700 includes one or more processors 705

(aka a "hardware processing unit"), a machine learning (ML) engine 710, a texture system 715, a depth system 720, graphics rendering engine(s) 725, a display system 730, input/output (I/O) interfaces 735, one or more sensors 740, and storage 745.

Regarding the processor(s) 705, it will be appreciated that the functionality described herein can be performed, at least in part, by one or more hardware logic components (e.g., the processor(s) 705). For example, and without limitation, illustrative types of hardware logic components/processors that can be used include Field-Programmable Gate Arrays ("FPGA"), Program-Specific or Application-Specific Integrated Circuits ("ASIC"), Application-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

The ML engine 710 may be implemented as a specific processing unit (e.g., a dedicated processing unit as described earlier) configured to perform one or more specialized operations for the computer system 700. As used herein, the terms "executable module," "executable component," "component," "module," or "engine" can refer to hardware processing units or to software objects, routines, or methods that may be executed on computer system 700. The different components, modules, engines, and services described herein may be implemented as objects or processors that execute on computer system 700 (e.g. as separate threads). The ML engine 710 (or perhaps even just the processor(s) 705) can be configured to perform any of the disclosed method acts or other functionalities.

Texture system 715 and depth system 720 may include the scanning sensor(s) 105 from FIG. 1 as well as any resources or processes used to process the data obtained by the scanning sensor(s) 105. In some cases, texture system 715 and/or the depth system 720 may include any number or type of cameras. For instance, the cameras can include any type of thermal camera (or thermal imaging sensor), any type of visible light camera, and/or any type of depth detection camera. Similarly, any type of depth detector may be included among the cameras. Examples include, but are not limited to, stereoscopic cameras (both active illumination and passive (i.e. no illumination)), time of flight cameras, range finders, or any other type of range or depth sensor. In this regard, numerous different techniques are available to determined depth and texture.

The graphics rendering engine 725 is configured, with the hardware processing unit 705, to render one or more virtual objects within the scene. As a result, the virtual objects accurately move in response to a movement of the user and/or in response to user input as the user interacts within the virtual scene. The computer system 700 may include a display system 730 (e.g., laser diodes, light emitting diodes (LEDs), microelectromechanical systems (MEMS), mirrors, lens systems, diffractive optical elements (DOEs), display screens, and/or combinations thereof) for presenting virtual objects within the scene.

I/O interface(s) 735 includes any type of input or output device. Such devices include, but are not limited to, touch screens, displays, a mouse, a keyboard, a controller, and so forth. Any type of input or output device should be included among I/O interface(s) 735, without limitation.

During use, a user of the computer system 700 is able to perceive information (e.g., a mixed-reality environment) through a display screen that is included among the I/O interface(s) 735 and that is visible to the user. The I/O interface(s) 735 and sensors 740/765 also include gesture detection devices, eye tracking systems, and/or other movement detecting components (e.g., head tracking cameras, depth detection systems, gyroscopes, accelerometers, magnetometers, acoustic sensors, global positioning systems ("GPS"), etc.) that are able to detect positioning and movement of one or more real-world objects, such as a user's hand, a stylus, and/or any other object(s) that the user may interact with while being immersed in the scene.

The computer system 700 may also be connected (via a wired or wireless connection) to external sensors 765 (e.g., one or more remote cameras, accelerometers, gyroscopes, acoustic sensors, magnetometers, etc.). It will be appreciated that the external sensors include sensor systems (e.g., a sensor system including a light emitter and camera), rather than solely individual sensor apparatuses.

Storage 745 may be physical system memory, which may be volatile, non-volatile, or some combination of the two. The term "memory" may also be used herein to refer to non-volatile mass storage such as physical storage media. If computer system 700 is distributed, the processing, memory, and/or storage capability may be distributed as well.

Storage 745 is shown as including executable instructions (i.e. code 750). The executable instructions (i.e. code 750) represent instructions that are executable by the processor(s) 705 of computer system 700 to perform the disclosed operations, such as those described in the various methods. Storage 745 is also shown as including data 755. Data 755 may include any type of data, including the texture data, depth data, pose data, tracking data, DNN data, the volumetric data structure, the meshes, and so forth, without limitation.

The disclosed embodiments may comprise or utilize a special-purpose or general-purpose computer including computer hardware, such as, for example, one or more processors (such as processor(s) 705) and system memory (such as storage 745), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 700 may also be connected (via a wired or wireless connection) to external sensors (e.g., one or more remote cameras) or devices via a network 760. For example, computer system 700 can communicate with any number devices or cloud services to obtain or process data. In some cases, network 760 may itself be a cloud network. Furthermore, computer system 700 may also be connected through one or more wired or wireless networks 760 to remote/separate computer systems(s) 770 that are configured to perform any of the processing described with regard to computer system 700.

A "network," like network 760, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 700 will include one or more communication channels that are used to communicate with the network 760. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A mixed-reality system comprising:
   one or more processors; and
   one or more computer-readable hardware storage devices that store computer-executable instructions that are executable by the one or more processor to cause the mixed-reality system to:
   obtain a first pair of images of a real-world environment;
   use the first pair of images to obtain a texture map of the real-world environment;
   use the first pair of images to obtain a depth map of the real-world environment;
   obtain a second pair of images of the real-world environment, the second pair of images being obtained at a later time than a time when the first pair of images were obtained such that a temporal offset exists between when the first pair of images were obtained and when the second pair of images were obtained;
   use the second pair of images to obtain an updated texture map of the real-world environment; and
   render a virtual representation of the real-world environment utilizing both the depth map and the updated texture map, said rendering being performed by:
   combining the updated texture map with the depth map to render the virtual representation, said combining occurring even though the second pair of images, which were used to obtain the updated texture map, were not used to obtain the depth map and even though the temporal offset exists between the first pair of images used to obtain the depth map and the second pair of images used to obtain the updated texture map.

2. The mixed-reality system of claim 1, wherein the mixed-reality system is further caused to:
   successively obtain a plurality of newly updated texture maps at a first frequency and a plurality of updated depth maps at a second frequency.

3. The mixed-reality system of claim 2, wherein the second frequency is less than the first frequency.

4. The mixed-reality system of claim 2, wherein the first frequency is within a range of 45 to 90 Hz and the second frequency is within a range of 15 to 30 Hz.

5. The mixed-reality system of claim 2, wherein the mixed-reality system further comprises a head-mounted display (HMD) and wherein the second frequency is dynamically updated based on a change in a position of the HMD relative to the real-world environment.

6. The mixed-reality system of claim 5, wherein the mixed-reality system detects the change in the position of the HMD relative to the real-world environment based on tracking data that indicate a position of the HMD.

7. The mixed-reality system of claim 5, wherein the mixed-reality system detects the change in the position of the HMD relative to the real-world environment based on a difference between at least two updated depth maps of the plurality of updated depth maps.

8. The mixed-reality system of claim 2, wherein the mixed-reality system is further caused to:
   render an updated virtual representation of the real-world environment including a combination of a newly updated texture map of the plurality of newly updated texture maps with a most recently obtained updated depth map of the plurality of updated depth maps, the most recently obtained updated depth map being obtained prior to the newly updated texture map.

9. The mixed-reality system of claim 1, wherein the first pair of images is obtained from a pair of stereo cameras.

10. The mixed-reality system of claim 9, wherein the depth map is obtained by performing stereo matching on the first pair of images.

11. The mixed-reality system of claim 10, wherein the stereo matching is performed as an asynchronous process.

12. The mixed-reality system of claim 1, wherein the mixed-reality system is further caused to:
detect a predicted pose of a user; and
reproject a portion of the depth map to conform to a user perspective associated with the predicted pose.

13. The mixed-reality system of claim 1, wherein combining the updated texture map with the depth map to render the virtual representation is performed in response to a determination that a perspective of the mixed-reality system has not substantially changed from the time when the first pair of images were obtained and the later time when the second pair of images were obtained.

14. The mixed-reality system of claim 1, wherein combining the updated texture map with the depth map to render the virtual representation is performed in response to a determination that a perspective of the mixed-reality system has changed from the time when the first pair of images were obtained and the later time when the second pair of images were obtained, and wherein a compensation is performed to account for the change in perspective.

15. A method for providing a mixed-reality pass-through experience, said method comprising:
obtaining a first pair of images of a real-world environment;
using the first pair of images to obtain a texture map of the real-world environment;
using the first pair of images to obtain a depth map of the real-world environment;
obtaining a second pair of images of the real-world environment, the second pair of images being obtained at a later time than a time when the first pair of images were obtained such that a temporal offset exists between when the first pair of images were obtained and when the second pair of images were obtained;
using the second pair of images to obtain an updated texture map of the real-world environment; and
rendering a virtual representation of the real-world environment utilizing both the depth map and the updated texture map, said rendering being performed by:
combining the updated texture map with the depth map to render the virtual representation, said combining occurring even though the second pair of images, which were used to obtain the updated texture map, were not used to obtain the depth map and even though the temporal offset exists between the first pair of images used to obtain the depth map and the second pair of images used to obtain the updated texture map.

16. The method of claim 15, wherein the first pair of images is obtained from a pair of stereo cameras.

17. The method of claim 15, further comprising:
detecting a predicted pose of a user; and
reprojecting a portion of the depth map to conform to a user perspective associated with the predicted pose.

18. The method of claim 15, further comprising:
successively obtaining a plurality of newly updated texture maps at a first frequency and a plurality of updated depth maps at a second frequency.

19. The method of claim 18, further comprising:
rendering an updated virtual representation of the real-world environment including a combination of a newly updated texture map of the plurality of newly updated texture maps with a most recently obtained updated depth map of the plurality of updated depth maps, the most recently obtained updated depth map being obtained prior to the newly updated texture map.

20. One or more hardware storage devices having stored thereon computer-executable instructions, the computer-executable instructions being executable by one or more processors of a computer system to cause the computer system to:
obtain a first pair of images of a real-world environment;
use the first pair of images to obtain a texture map of the real-world environment;
use the first pair of images to obtain a depth map of the real-world environment;
obtain a second pair of images of the real-world environment, the second pair of images being obtained at a later time than a time when the first pair of images were obtained such that a temporal offset exists between when the first pair of images were obtained and when the second pair of images were obtained;
use the second pair of images to obtain an updated texture map of the real-world environment; and
render a virtual representation of the real-world environment utilizing both the depth map and the updated texture map, said rendering being performed by:
combining the updated texture map with the depth map to render the virtual representation, said combining occurring even though the second pair of images, which were used to obtain the updated texture map, were not used to obtain the depth map and even though the temporal offset exists between the first pair of images used to obtain the depth map and the second pair of images used to obtain the updated texture map.

* * * * *